United States Patent [19]

Marvel et al.

[11] 4,356,298

[45] Oct. 26, 1982

[54] POLYAROMATIC ETHER-KETONE-SULFONES CONTAINING 1,3-BUTADIENE UNITS

[75] Inventors: Carl S. Marvel, Tucson, Ariz.; Venkatesa Sankaran, Wilmington, Del.

[73] Assignee: The United States of America as represented by the Secretary of the Air Force, Washington, D.C.

[21] Appl. No.: 265,721

[22] Filed: May 20, 1981

[51] Int. Cl.³ .............................................. C08G 75/23
[52] U.S. Cl. .................................... 528/173; 528/125; 528/128
[58] Field of Search .......................... 528/173, 125, 128

[56] References Cited

U.S. PATENT DOCUMENTS

| | | | |
|---|---|---|---|
| 2,687,383 | 8/1954 | D'Alelio | 260/2.2 |
| 3,759,860 | 9/1973 | Peaker | 260/29.7 SQ |
| 3,935,167 | 1/1976 | Marvel et al. | 260/49 |
| 4,010,147 | 3/1977 | Rose | 260/793 M |
| 4,291,153 | 9/1981 | Noonan et al. | 528/173 |
| 4,296,232 | 10/1981 | Maresca et al. | 528/173 |

*Primary Examiner*—Lester L. Lee
*Attorney, Agent, or Firm*—Donald J. Singer; William J. O'Brien

[57] ABSTRACT

The acid chloride of 1,4-bis-p-carboxyphenyl-1,3-butadiene and isophthaloyl chloride were polymerized with 4,4-diphenoxy-diphenyl sulfone and diphenyl ether in a Friedel-Crafts type polymerization. The resulting polymers contained 5–20 mole % of butadiene units and were insoluble in all solvents.

2 Claims, No Drawings

POLYAROMATIC ETHER-KETONE-SULFONES CONTAINING 1,3-BUTADIENE UNITS

STATEMENT OF GOVERNMENT INTEREST

The invention described herein may be manufactured and used by or for the Government for governmental purposes without the payment of any royalty thereon.

BACKGROUND OF THE INVENTION

This invention relates to a series of novel polymeric compounds and to a method for their preparation. More particularly, this invention concerns itself with polyaromatic ether-ketone-sulfones which contain 1,3-butadiene units as substituents along the polymer chain and to a method for effecting their synthesis.

In recent years a considerable research effort has been undertaken in an attempt to develop curable resinous materials that are useful for laminating applications. Such resins must possess a high degree of thermal stability and strength after curing coupled with good solubility characteristics before curing. As a result, a number of thermally stable polymers have been developed as laminating resins. Generally, aromatic heterocyclic nuclei connected with functional groups, such as carbonyl, sulfonyl and ether linkages, form the backbone of these polymers. Unfortunately, the cross-linking or curing processes used in synthesizing these resins liberate gaseous side products which have the deleterious effect of producing voids in the cured laminating resin which, in turn, substantially weakens the final laminated product. Hence, it becomes obvious that thermally stable laminating resins are needed that are not only low melting and soluble prior to cross-linking, but also can be cured without giving off any volatile side products. The research effort which culminated in the present invention, therefore, was directed toward providing a solution to that problem and to the synthesis of novel polymeric materials which possess the requisite characteristics of thermal stability, strength, solubility before curing and absence of gaseous voids.

SUMMARY OF THE INVENTION

The present invention concerns itself with novel 1,3-butadiene containing polymeric materials which have been found to be especially useful as laminating resins. The polymers of this invention are polyaromatic ether-ketone-sulfones. They are synthesized by effecting a Friedel-Crafts type polymerization reaction from a mixture of the acid chloride of 1,4-bis-p-carboxyphenyl-1,3-butadiene; 4,4'-diphenoxy-diphenyl sulfone; isothaloyl chloride; and diphenyl ether.

Accordingly, the primary object of this invention is to provide novel polyaromatic ether-ketone-sulfones containing 1,3-butadiene units on the polymeric chain.

Another object of this invention is to provide a curable polymeric material that does not develop gaseous side products when subjected to cross-linking or curing procedures.

Still another object of this invention is to provide a polymeric material particularly adapted for use as a laminating resin and characterized by good solubility before curing coupled with a high degree of thermal stability and strength after curing.

The above and still other objects and advantages of the present invention will become more readily apparent upon consideration of the following detailed description thereof.

DESCRIPTION OF THE PREFERRED EMBODIMENT

In accordance with this invention, it has been found that the above noted objects can be accomplished through the synthesis of novel polyaromatic ether-ketone-sulfones containing 1,3-butadiene units. The polymeric materials of this invention are represented by the following structural formula:

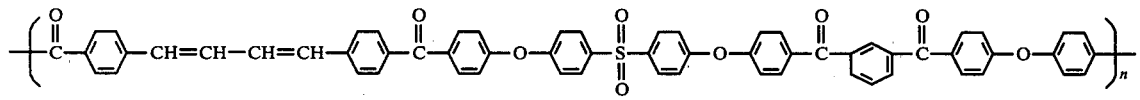

wherein n is an integer of from twenty to thirty.

These compounds represent a novel group of 1,3-butadiene containing polymeric materials that have been found to be especially useful as laminating resins in the fabrication of a variety of laminated structures. The polymers are prepared from a mixture of geometric isomers of the acid chloride of 1,4-bis-p-carboxyphenyl-1,3-butadiene(XI), 4,4'-diphenoxydiphenyl sulfone (XII), isophthaloyl chloride (XIV) and diphenyl ether (XIII) in various mole ratios using dichloromethane as a solvent. Molar quantities of aluminum chloride were used as a catalyst. The polymerization reaction was carried out in a nitrogen atmosphere at room temperature for 24 hr. The polymer precipitated from the reaction mixture during polymerization. The solid was collected by filtration, poured into a large amount of methanol with vigorous agitation and filtered. The polymer was washed with boiling methanol three times and dried in vacuum at 100° C. The yield was over 90%. The polymers did not melt below 360° C.

Specific examples of the polymers of this invention are shown in Table I. The particular monomeric reactants along with their structural formula and mole ratios are designated by numerals XI, XII, XIII, and XIV. The resulting polymers are designated by numerals P-I to P-XII inclusive.

TABLE I
COMPOSITION, SOLUBILITY AND ELEMENTARY ANALYSIS RESULTS OF POLYMERS

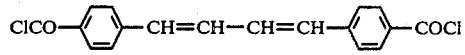

XI

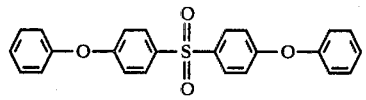

XII

 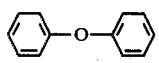

XIV    XIII

Solubility of Polymer

| Polymer | Monomer Mole Ratio XI:XII:XIII:XIV | Analysis calcd. C% | H% | found C% | H% | Solubility DMF, DMA, DMSO H$_2$SO$_4$, Pyridine |
|---|---|---|---|---|---|---|
| P-I | 1:5:3:7 | | | | | Swollen |
| P-II | 1:5:4:8 | | | | | " |
| P-III | 1:3:5:7 | | | | | " |
| P-IV | 1:4:5:8 | | | | | " |
| P-V | 1:7.5:5:11.5 | 74.72 | 3.26 | 74.68 | 3.20 | " |
| P-VI | 1:10:10:19 | | | | | " |
| P-VII | 1:15:10:24 | | | | | " |
| P-VIII | 1:3.6:1.4:4 | 74.63 | 3.93 | 74.15 | 3.96 | " |
| P-IX | 1:15:5:19 | 71.65 | 3.84 | 71.73 | 3.89 | " |
| P-X | 1:7:3:9 | 72.1 | 3.86 | 72.93 | 3.99 | " |
| P-XI | 1: 25:24 | | | | | " |
| P-XII | 1:25: 24 | | | | | Swollen |

The softening temperatures of the polymers were measured by a Vicat-type apparatus under a load on the sample of 44.9 psi with a heating rate of 1° C./min. The softening temperatures of P-I to P-XII were in the range of 185° C. to 195° C.

A Perkin-Elmer DSC-1B differential scanning calorimeter was used to measure the thermogram. None of the polymers showed any glass transition below 400° C.

The 1,4 para substituted carboxyphenyl butadiene monomer is the key intermediate in the synthesis of the polymers of this invention. Though the preparation of 1,4-diphenyl butadiene has been undertaken heretofore, the synthesis of this substituted phenyl butadiene monomer contemplated by this invention is unknown. It is prepared through a series of reactions as illustrated in Examples 1 through 8. These examples disclose specifically the preparation of the various monomers utilized in the synthesis of the acid chloride of 1,4-bis-p-carboxyphenyl-1,3-butadiene (XI) monomer which in turn is utilized in preparing the polymers of this invention.

EXAMPLE 1
Methyl-α-bromotoluate (IV)

Methyl-α-bromotoluate was prepared by the method of Fuson and Cooke, as disclosed in J. Am. Chem. Soc., 62, 1180 (1940), by bromination of p-toluylchloride and subsequent esterification with methanol. Our product distilled at 105°–110° C./0–1 mm. Recrystallization from hexane gave 85 g of white needles. Yield 74% m.p. 54°–55° C. (lit. 54°–55° C.)[3]. The infrared spectrum (Nujol) showed absorption at 1720 cm$^{-1}$

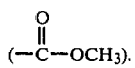

NMR (CDCl$_3$) showed 3.8 (s,—COOCH$_3$,3), 4.4 (s,—CH$_2$Br,2), and 7.2–8.0 (q, aromatic, 4).

EXAMPLE 2
P-Carbomethoxybenzaldehyde (V)

A mixture of 68.7 g (0.3 mole) of methyl-α-bromotoluate, 84 g (0.6 mole) of hexamethylenetetraamine, 150 ml of acetic acid and 150 ml of water were refluxed with stirring for two hr. Ninety ml of concentrated hydrochloric acid was then added and kept at room temperature for 15 min. The cooled solution was extracted with ether, washed with water, 10% NaHCO$_3$ solution, water and dried. Evaporation of the solvent and recrystallization of the residue from petroleum ether gave 35 g of p-carbomethoxybenzaldehyde, yield 71% m.p. 61°–63° C. (lit. m.p. 61°–63° C.). The infrared spectrum showed absorption at 1720 cm$^{-1}$

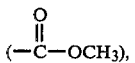

1690 cm$^{-1}$ (—CHO). NMR (CDCl$_3$) δ3.8 (s,—COOCH$_3$,3), 7.8–8.2 (m, aromatic, 4), and 10.2 (s,—CHO,1)

EXAMPLE 3
Formylmethyltriphenylphosphorane (VI)

This compound has been prepared by S. Trippett and D. M. Walker. We used a slightly modified procedure. In a 3-necked 2-l flask, fitted with a mechanical stirrer, dropping funnel, condenser and an inlet for N$_2$ gas, 250 ml etherial 1.16 N-butyl lithium was added to a stirred suspension of 107 g of methyl triphenyl phosphonium bromide in 1-l of ether. After stirring for an hour, the solution was slowly added to a stirred solution of 27 g of ethyl formate in 500 ml of ether. The mixture was stirred for one hour, extracted with diluted hydrochloric acid (3×250 ml) and the combined extracts were made alkaline with dilute sodium hydroxide solution. The organic portion was extracted with benzene, washed with water and dried. Evaporation of the solvent and recrystallization from acetone gave 60 g of formylmethylenetriphenylphosphorane m.p. 186°–187° C. (lit. m-p. 186°–187° C.). The infrared spectrum showed absorption at 1700 cm$^{-1}$ (—CHO) NMR (CDCl$_3$) δ7.2–8.0 (m, aromatic, 15) 8.3 (d,=C$\underline{H}$, 1), and 9.3 (d, C$\underline{HO}$, 1).

EXAMPLE 4
P-Carbomethoxybenzyltriphenyl phosphonium bromide (VII)

A mixture of 46 g (0.2 mole) of methyl-α-bromotoluate and 105 g (0.4 mole) of triphenyl phosphine in 800 ml of dry benzene was refluxed for 2 hr. After 15 minutes, the phosphonium bromide started precipitating out from the solution. After cooling the flask to room temperature, the solid was filtered, washed with plenty of petroleum ether and dried. The yield was 98 g m.p.

258°-260° C. The infrared spectrum showed absorption at 1720 cm$^{-1}$

NMR (CDCl$_3$) showed δ3.8 (s,—COCH$_3$, 3), 5.5-5.8 (d, —CH$_2$-p, 2) and 7-8 (m, aromatic, 19). The phosphonium bromide was used in the next step without further purification.

EXAMPLE 5

4-Carbomethoxycinnamaldehyde (VIII)

A solution of 27.3 g (0.09 mole) of formyl methyltriphenyl phosphonium bromide and 14.8 g (0.09 mole) of p-carbomethoxybenzaldehyde in 900 ml of dry toluene was refluxed under nitrogen for 24 hr. After evaporating toluene under reduced pressure, the residue was chromatographed over silica column with 5% ethyl acetate in petroleum ether as eluant. The second fraction obtained by using 10% ethyl acetate in petroleum ether gave 4-carbomethoxycinnamaldehyde. Recrystallization from benzene gave 12.5 g 4-carbomethoxycinnamaldehyde, yield 73% m.p. 99°-101° C. The infrared spectrum showed absorption at 1720 cm$^{-1}$

1680 cm$^{-1}$ (CHO), and 1620 cm$^{-1}$ (—CH=CH—). NMR (CDCl$_3$) showed δ3.8 (s, —COOCH$_3$, 3) 6.5-7.1 (m,=CH—CHO, 1), 7.3-7.6 (m, aromatic, 4), 7.9-8.1 (d, —CH=, 1), and 9.8 (d, —CHO, 1). Analysis calculated for C$_{11}$H$_{10}$O$_3$: C, 69.42%, H, 5.2%. Found: C, 68.69%, H, 5.25%.

EXAMPLE 6

1,4-Bis-p-carbomethoxyphenyl-1,3-butadiene (IX)

To a stirred mixture of 10.5 g (0.055 mole) of 4-carbomethoxycinnamaldehyde, 53.9 g (0.11 mole) of 4-carbomethoxybenzyltriphenyl phosphonium bromide, and 3.7 g (0.01 mole) of tetrabutylammonium iodide in 250 ml of dichloromethane 400 ml of 50% potassium carbonate was added drop by drop. After the addition, the mixture was stirred at 3 hr at room temperature. The dichloromethane was separated, washed with water, dried and evaporated. The residue was triturated with ether to remove triphenylphosphine oxide. Recrystallization from large volume of hot chloroform gave 14.6 g of 1,4-bis-p-carbomethoxyphenyl-1,3-butadiene, yield 82%. m.p, 242°-243° C. The geometric isomers were separated by fractional crystallization from chloroform, one isomer (3 parts) melting at 235°-237° C. and the other isomer (7 parts) at 249°-250° C. However, the mixture of isomers was used for the next step. The infrared spectrum showed absorption at 1720 cm$^{-1}$ (—COOCH$_3$) 1610 cm$^{-1}$ (—C=C—), 965 cm$^{-1}$ (trans-C=C—) and 720 cm$^{-1}$ (cis-C=C—). NMR (CDCl$_3$) showed 3.9 (s, —COOCH$_3$, 6), 6.4-6.8 (m, =CH—CH=,2), 7.2-7.4 (m, aromatic, 8) and 7.9-8.1 (m, CH=C—C=CH, 2). Mass spectrum gave molecular ion peak at 322. Analysis calculated for C$_{20}$H$_{18}$O$_4$; C, 74.75%; H, 5.61%. Found: C, 74.57%; H, 5.61%.

EXAMPLE 7

1,4-Bis-p-carboxyphenyl-1,3-butadiene (X)

10 g of 1,4-bis-p-carbomethoxyphenyl-1,3-butadiene in 500 ml of pyridine and 20% of 100 ml of sodium hydroxide were gently refluxed with stirring for 3 hr under nitrogen. After cooling, the precipitated solid was filtered and washed with plenty of ether to remove pyridine. Neutralization with boiling 20% hydrochloric acid gave 9 gm of the desired acid. Yield, quantitative. This acid did not melt below 360° C. The infrared spectrum showed absorption at 3450 cm$^{-1}$ (hydroxyl), 1690 cm$^{-1}$ (C=O of the carboxylic acid), and 1610 cm$^{-1}$ (—C=C—). The acid was used in the next step without further purification.

EXAMPLE 8

Acid Chloride of 1,4-bis-p-carboxyphenyl-1,3-butadiene (XI)

8.9 g (0.03 mole) of 1,4-bis-p-carboxyphenyl-1,3-butadiene and 3 drops of pyridine in 90 ml of thionyl chloride was gently refluxed with stirring for 6 hr. The excess thionyl chloride was distilled off and the last traces of thionyl chloride were removed by distillation with dry benzene. Recrystallization from dichloromethane gave 9.1 g of the acid chloride, yield 92% m.p. 228°-230° C. The infrared spectrum showed absorption at 1750 cm$^{-1}$ (—COCl) and 1610 cm$^{-1}$ (—C=C—). NMR (CDCl$_3$) showed δ6.1-7.2 (m, aromatic, CH=CH—CH=CH, 12). Analysis calculated for C$_{18}$H$_{12}$O$_2$CL$_2$; C, 65.20%; H, 3.69%; Cl, 21.41%. Found: C, 65.08%; H, 3.69%; Cl, 20.73%.

As was disclosed heretofore, the 1,4-p-substituted carboxyphenyl butadiene is the key monomer used in preparing the polymers P-I to P-XII that are disclosed in Table I. Though the preparation of 1,4-diphenyl butadiene has been reported heretofore, the synthesis of this substituted phenylbutadiene is unknown. Since the dienes are more commonly prepared through the conventional Wittig Reaction, it would be expected that the monomer (IX) might be obtained either by a one step or a multi step method, as shown below in equations II and III:

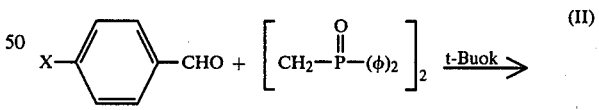

(II)

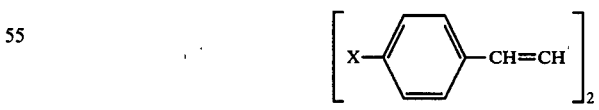

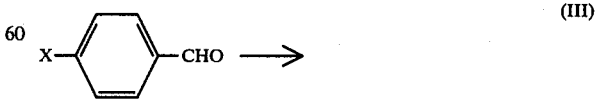

(III)

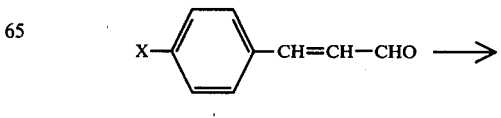

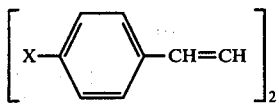

Unfortunately, methods II and III were not successful and were discarded due to two reasons: (A) the starting phosphorus compound was expensive and could not be recovered, and (B) several attempts to synthesize monomer (IX) gave poor or no yield. However, as illustrated by Examples 1 to 8, the preparation of p-carbomethoxycinnamaldehyde (VIII) was achieved in 73% yield, which was then converted to 1,4-bis-p-carbomethoxyphenyl-1,3-butadiene (IX) in 82% yield. The carbomethoxy group, which was essential for the synthesis of the polymer, was kept intact throughout the operation by selecting milder experimental conditions.

The polymerization of the XI, XII, XIII and XIV monomers was carried out by Friedel-Crafts acylation under nitrogen in dichloromethane with anhydrous aluminum chloride as catalyst. The resulting polymers were found to contain 5–20 mole % of butadiene units. All polymers P-I to P-XII were swollen in all solvents but have no melting points below 400° C.

From an examination of the foregoing, it will be seen that the present invention provides a new class of polyaromatic ether-ketone-sulfones which have been found to be especially useful when employed as laminating resins. These materials exhibit excellent thermal stability and strength after curing as well as good solubility before curing. The problem of forming voids in the finally cured polymer, a problem which occurred with prior art curing techniques due to the presence of gaseous side products, has been avoided also by practicing the present invention.

It should be understood by those skilled in the art to which the present invention pertains that while the compounds disclosed herein illustrate preferred embodiments of the invention, various modifications and alterations may be made without departing from the spirit and scope thereof, and that all such modifications as fall within the purview of the appended claims are intended to be included herein.

What is claimed is:

1. A polyaromatic ether-ketone-sulfone containing 1,3-butadiene units and consisting essentially of recurring units having the following structural formula:

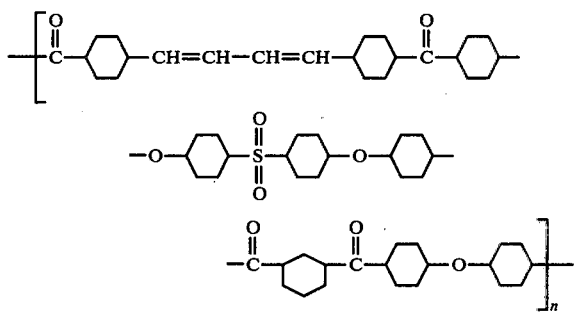

wherein n is an integer of from twenty to thirty.

2. A process for synthesizing a polyaromatic ether-ketone sulfone containing 1,3-butadiene groups along the polymer chain which comprises the steps of (A) forming a reaction mixture of (1) the acid chloride of 1,4-bis-p-carboxyphenyl-1,3-butadiene, (2) isophthaloyl chloride, (3) 4,4-diphenoxy-diphenylsulfone, and (4) diphenyl ether; (B) polymerizing said reaction mixture within an atmosphere of nitrogen at room temperature for a period of about 24 hours; and (C) separating the resultant polymerized reaction product.

* * * * *